United States Patent [19]

Seiss et al.

[11] Patent Number: 4,716,197

[45] Date of Patent: Dec. 29, 1987

[54] POLYETHYLENE/EPDM-GRAFT POLYSTYRENE BLENDS

[75] Inventors: Randolph H. Seiss; Edward H. Yonkers, both of Midland, Mich.

[73] Assignee: The Dow Chemical Company, Midland, Mich.

[21] Appl. No.: 854,281

[22] Filed: Apr. 21, 1986

[51] Int. Cl.$^4$ .................. C08L 23/06; C08L 23/18; C08L 25/04; C08L 51/04

[52] U.S. Cl. .................................. 525/75; 525/70; 525/86; 525/240

[58] Field of Search ......................... 525/70, 75, 240

[56] References Cited

U.S. PATENT DOCUMENTS

| | | | |
|---|---|---|---|
| 3,375,302 | 3/1968 | Iwai et al. | 260/876 |
| 3,489,821 | 1/1970 | Witt et al. | 260/876 |
| 3,639,511 | 2/1972 | Kreibick et al. | 260/878 |
| 3,849,518 | 11/1974 | Severini et al. | 260/878 R |
| 3,876,727 | 4/1975 | Meredith et al. | 260/878 |
| 3,957,919 | 5/1976 | Von Bedungen et al. | 260/897 |
| 3,959,211 | 5/1976 | Cooper et al. | 260/42.18 |
| 4,166,081 | 8/1979 | Fournier et al. | 525/75 |
| 4,202,948 | 5/1980 | Peascoe et al. | 525/70 |
| 4,319,001 | 3/1982 | Spielsu et al. | 525/70 |
| 4,330,639 | 5/1982 | Matsuura et al. | 525/240 |
| 4,409,365 | 10/1983 | Coran et al. | 525/78 |
| 4,430,477 | 2/1984 | Kunimune | 525/70 |
| 4,460,745 | 7/1984 | Adur et al. | 525/74 |
| 4,490,508 | 12/1984 | Nagano et al. | 525/70 |
| 4,503,187 | 3/1985 | Gunesin et al. | 525/71 |

FOREIGN PATENT DOCUMENTS 285285 8/1981 Argentina .

OTHER PUBLICATIONS

B P Chimie, "Abstract of Ep 52-555", 5/82.
BASF, "Abstract of DT2413-375", 10/75.
Paul—"Interfacial Agents . . . ", Polymer Blends, vol. 2-1978, pp. 35-41 and 50-53.

Primary Examiner—Carman J. Seccuro
Attorney, Agent, or Firm—Price, Henereld, Cooper, DeWitt & Litton

[57] ABSTRACT

The specification discloses a polymer blend comprising from about 20 to 90% of an olefin combination including a high density polyolefin and a linear low density polyolefin, from about 6 to about 60% of a vinyl aromatic polymer and from about 4 to about 20% of a compatibilizer therefore.

21 Claims, No Drawings

POLYETHYLENE/EPDM-GRAFT POLYSTYRENE BLENDS

BACKGROUND OF THE INVENTION

The present invention relates to blends of olefinic polymers and vinyl aromatic polymers. Compatibilizers, usually some type of rubber copolymer or graft rubber copolymer, are necessary third ingredients in order to facilitate mixing of the olefinic polymers with the vinyl aromatic polymers. It is desirable to blend such components in an attempt to obtain the thermoforming properties of vinyl aromatic polymers and the strength properties, especially impact strength, of olefin polymers.

Polystyrene and high density polyethylene blends have good thermoforming properties. Under some circumstances, they also show good impact strength. However, when they are extruded, the resulting extruded products exhibit oriented strength properties. Impact strength is good in a direction transverse of the direction of extrusion (sometimes referred to herein as the cross directions). However, in the direction of the extrusion, i.e., the machine direction, impact strength is very poor.

SUMMARY OF THE INVENTION

In the present invention, it has been discovered that blends of vinyl aromatic polymer, high density polyolefin polymer, compatibilizer and linear, low density olefin polymers exhibit both surprisingly higher impact strength as well as surprisingly improved impact strength in the machine direction when extruded.

DESCRIPTION OF THE PREFERRED EMBODIMENT

In the preferred embodiment, from about 20 to about 90% olefin is blended with from about 4 to about 20% compatibilizer and from about 6 to about 60% vinyl aromatic polymer. From about 15 to 85% of the polyolefin content comprises a linear low density polyolefin, most preferably linear low density polyethylene. The remainder of the 20 to 90% is preferably a high density polyethylene. The most preferred vinyl aromatic is polystyrene and the most preferred compatibilizer is a graft polystyrene ethylene propylene diene monomer rubber (EPDM-graft polystyrene).

Linear low density polyethylene (LLDPE) operable in this invention is typically a copolymer of ethylene and up to about 20 weight percent of at least one additional α-olefin monomer having from 3 to 25 carbon atoms per molecule. LLDPE is generally prepared by a low pressure polymerization process using a coordination catalyst and is structurally an intermediate between the long linear chains of high density polyethylene (HDPE) and the highly branched chains of low density polyethylene (LDPE). The density of LLDPE generally ranges from about 0.91 grams per cubic centimeter to about 0.94 grams per cubic centimeter (ASTM D 792), with melt indexes in the range of from about 0.01 to about 15 grams per 10 minutes. One specific linear low density polyethylene available from The Dow Chemical Company, Midland, Mich., which is useful in the present invention is LLDPE 2045, which has a density of 0.920 grams per cubic centimeter and a melt index of 1 gram per ten minutes. It and other suitable LLDPE's are shown in Table 1 below:

TABLE 1

| LDPE | MELT INDEX[1] | DENSITY |
|---|---|---|
| 2084 | 1 | .935 grams per cubic centimeter |
| 2440 | 4 | .935 grams per cubic centimeter |
| 2045 | 1 | .92 grams per cubic centimeter |
| 2037 | 2.3 | .935 grams per cubic centimeter |
| 2047 | 2.3 | .917 grams per cubic centimeter |

[1]Melt index in grams per 10 minutes.

The ethylene propylene diene monomer (EPDM) grafting base used to obtain the EPDM-graft polystyrene is a terpolymer of ethylene, propylene and a nonconjugated diene such as 1,4-hexadiene, or 5-ethylidene-2-norbornene. Suitable EPDM base rubbers comprise from about 25 to 75 percent by weight ethylene, from about 20 to about 65 percent by weight propylene and from about 1 to about 10 percent by weight diene. A preferred diene is 5-ethylidene-2-norbornene.

The method whereby the polystyrene is grafted to the EPDM base rubber appears to be not critical. The EPDM can be contacted with the polystyrene in a polymerization system of the well known mass, mass-solution, suspension, mass-suspension types or the like. The grafting reaction can be free radical (thermally, chemically or radiation initiated), and anionic or Fridel-Crafts.

When grafting an EPDM rubber substrate or other substrate having residual unsaturation, it has been found very advantageous to initially hydroperoxidize, utilizing singlet oxygen, at least a portion of the double bonds present in the residually unsaturated α-olefin copolymer substrate by the combination in solution of: the substrate containing some unsaturation, a sensitizing compound such as methylene blue and oxygen, then exposing this mixture to the light from a high pressure sodium vapor lamp. The α-olefin copolymer hydroperoxide formed in this manner can then be conveniently grafted at these hydroperoxide sites by a peroxy-compound-initiated grafting reaction. Other techniques for grafting monovinylidene aromatic polymer onto α-olefin copolymer substrates are taught in U.S. Pat. Nos. 3,489,822; 3,489,821; 3,642,950; 3,819,765; 3,538,190; 3,538,191; 3,538,192; 3,657,395; 3,671,608; 3,638,050; 3,876,727; and 4,340,669.

The graft ratio, i.e., the weight of the grafted polystyrene to the weight of the substrate EPDM rubber may vary from about 0.1 to about 2. Preferably, the graft ratio is from about 0.7 to about 2. The weight average molecular weight of the grafted polystyrene chains is about 150,000 to about 225,000. It will be appreciated by those skilled in the art that some variation in this molecular weight and in the graft ratio can be used to alter various properties of the blend of the present invention.

Preferably, the source of vinyl aromatic polymer used in the blend of the present invention comprises ungrafted polymer formed at the same time and from the same monomer as is grafted onto the backbone rubber. The EPDM graft polystyrene used in the present invention has ungrafted polystyrene intermixed therein with a molecular weight comparable to the molecular weight of the grafted polystyrene chains. Typically from about 70 to about 90% of the polystyrene present in the EPDM graft polystyrene rubber will be ungrafted. The free polystyrene also has a weight average molecular weight of from about 150,000 to 225,000. Additional polystyrene may be added to the blend, but it is optional.

In addition, some of the EPDM base rubber may remain ungrafted during the process. The graft ratio is determined based on the total weight of EPDM rubber, including both grafted and ungrafted rubber. The percentage of grafted rubber will be high, e.g., in excess of 70%. Examples of EPDM graft polystyrene rubbers, including free polystyrene, useful in the present invention, along with their total, grafted and free polystyrene content, are listed in Table 2 below:

TABLE 2

| EPDM Rubber | A EPsyn ® 5508 | B EPsyn ® 5508 | C EPsyn ® 5508 | D Expt'l[1] | E EPsyn ® 5508 |
|---|---|---|---|---|---|
| Wt % Ethylene | 69 | 69 | 69 | 47 | 69 |
| Wt % Propylene | 27 | 27 | 27 | 49 | 27 |
| Wt % 5-Ethylidene-2-norbornene | 4 | 4 | 4 | 4 | 4 |
| [—OOH] ($\mu$M/g) | 17.4 | 14.9 | 12.3 | 8 | 16.8 |
| G/R | 0.95 | 1.45 | 1.24 | 0.80 | 0.84 |
| Wt % Rubber Grafted | 73 | 89 | * | * | * |
| Polystyrene[2] | | | | | |
| Mn | 89,600 | 65,700 | 100,000 | 86,600 | 96,100 |
| Mw | 208,000 | 147,000 | 224,000 | 194,000 | 209,000 |
| Wt % EPDM Rubber in the Combination | 14.9 | 14.7 | 13.5 | 15.4 | 16.7 |
| Wt % PS in the Combination | 85.1 | 85.3 | 86.5 | 84.6 | 83.3 |
| Grafted PS | 14.2 | 21.3 | 16.7 | 12.3 | 14.0 |
| Free PS | 70.9 | 64.0 | 69.8 | 72.3 | 69.3 |

® Trademark of Copolymer Rubber and Chemical Corporation
*Not measured
[1]An experimental EPDM rubber having the indicated composition.
[2]The ungrafted polystyrene component will have comparable molecular weight.

The optional high density polyethylenes used in the preferred embodiment have a density of at least about 0.94 grams per cubic centimeter as determined by ASTM test method D1505, and a melt index in the range of from about 0.01 to about 35 grams per ten minutes. Melt indexes are determined by ASTM test method D1238. Exemplary high density polyethylenes which can be used in the present invention and which are available from The Dow Chemical Company, Midland, Mich. are set forth in Table 3 below:

TABLE 3

| | Density (g/cc) | Melt Index (g/10 min) |
|---|---|---|
| HDPE 12065 | 0.965 | 0.9 |
| HDPE 69065 | 0.965 | 0.60 |
| HDPE 25057 | 0.955 | 0.25 |
| HDPE 05054P | 0.954 | 5.0 |

The foregoing components are blended together using conventional blending equipment. Suitable melt blending equipment includes extruders equipped with mixing sections, Banbury TM mixers, two roll mills and injection molding equipment. In examples 1-3, Table 4 below, the polymer components were melt blended together in a Banbury TM mixer.

EXAMPLES

TABLE 4

Impact Strength Of Blends With And Without Linear Low Density Polyethylene

In Examples 1-3 shown in Table 4 below, the polymer components were melt blended in a Banbury TM shear mixer and then compression molded at 200 degrees C. and 60,000 psi. Izod impact was determined in foot pounds per inch and was determined in accordance with ASTM test method D-256 at 23 degrees C.

TABLE 4

| | 1 | 2 | 3 |
|---|---|---|---|
| % EPDM-g-PS and Free Polystyrene | 36 | 36 | 36 |
| % HDPE | 64 | 32 | — |
| % LLDPE | — | 32 | 64 |
| Izod Impact | 6.0 | 16.3 | 12.4 |

It can be seen that the Izod impact of the high density polyethylene-EPDM graft polystyrene blend was only 6 foot pounds per inch. The EPDM graft polystyrene and linear low density polyethylene blend had an Izod impact of 12.4 foot pounds per inch. The blend of all three, however, had a surprising 16.3 foot pounds per inch Izod impact strength.

TABLE 5

Comparing Directional Properties Of Extruded Blends

Examples 4 and 5, Table 5, were prepared by compounding in a two roll mill having front and back roll temperatures of 185 degrees C. and 150 degrees C. respectively, and then extruding the polymer blends in a Brabender TM extruder. Chip impact strength was determined in the machine direction (MD) and in a direction transverse to the machine direction (CD). ASTM test method D-4508-85 at 23 degrees C. was used to determine chip impact in foot pounds per inch.

TABLE 5

| | 4 | 5 |
|---|---|---|
| EPDM-g-PS and Free Polystyrene, % | 36 | 36 |
| HDPE | 64 | 48 |
| LLDPE | — | 16 |
| | 100 | 100 |
| Chip Impact | | |
| MD | 22.6 | 20.3 |
| CD | 3.9 | 18.9 |

TABLE 5-continued

|  | 4 | 5 |
|---|---|---|
| MD/CD | 5.7 | 1.1 |

As can be seen, the high density polyethylene/EPDM graft polystyrene blend is highly directional in orientation. Machine direction chip impact was quite good for this blend, but in the cross direction it was an unsatisfactory 3.9. The ratio of machine direction chip impact to cross direction chip impact was 5.7.

In contrast, when linear low density polyethylene was incorporated into the blend, even as only 25% of the polyethylene total, chip impact in the cross direction improved to 18.9 foot pounds per inch, while in the machine direction it remained order of magnitude comparable to the same value for the high density polyethylene only blend.

TABLE 6

Variations In Amount Of Linear Low Density Polyethylene Added

Examples 6-9 in Table 6 are all blends of EPDM graft polystyrene including free polystyrene, high density polyethylene, and linear low density polyethylene. The components were melt blended in a Banbury ™ mixer. In all four examples, the EPDM graft polystyrene content and the polystyrene content were kept constant and the total polyethylene content was kept constant. However, the amount of linear low density polyethylene relative to high density polyethylene was varied and Table 6 shows the percentage of linear low density polyethylene to total polyethylene content for each example. The tensile strengths, yield and rupture, elongation and tensile modulus were determined according to ASTM D-638 at a specimen stretching rate of 2 inches per minute. Izod impact was determined in accordance with ASTM D-256 at 23 degrees C.

TABLE 6

|  | 6 | 7 | 8 | 9 |
|---|---|---|---|---|
| EPDM-g-PS and Free Polystyrene | 360 | 360 | 360 | 360 |
| HDPE | 512 | 384 | 256 | 128 |
| LLDPE | 128 | 256 | 384 | 512 |
| % LLDPE to total PE | 20 | 40 | 60 | 80 |
| Tensile yield 2"/m | 3270 | 2970 | 2500 | 2180 |
| Tensile rupture | 2570 | — | — | — |
| Elongation | 116 | >200 | >200 | >200 |
| Modulus | 2.23 | 1.81 | 1.57 | 1.18 |
| Izod | 13.4 | 15.2 | 16.0 | 15.6 |

Three of the samples with linear low density polyethylene at 40% or above would not rupture. The test results suggest that for maximizing impact strength, the linear low density polyethylene content as a percentage of total polyolefin, should be between about 40 and 80%, and preferably 50 to 70%.

ALTERNATIVE EMBODIMENTS

It will of course be recognized that equivalent high density and linear low density olefins can be substituted for the polyethylenes. Examples include polymers of propylene and butene as well as copolymers of two or more olefins such as ethylene, propylene and butene. Copolymers of one or more of these monomers with one or more copolymerizable monomers having from 5 to 25 carbon atoms and ethylenically unsaturated carboxylic acids (both mono- and difunctional) as well as derivatives of these acids, such as esters and anhydrides would be recognized by those skilled in the art.

Similarly, those skilled in the art would recognize the existence of other equivalents for polystyrene for use as the monovinylidene aromatic monomer to be grafted onto the α-olefin copolymer rubber. Such monomers are represented by the following formula:

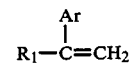

wherein $R_1$ is selected from the group of radicals consisting of hydrogen and alkyl radicals containing three carbons or less, and Ar is selected from the group of radicals consisting of phenyl, halophenyl, alkylphenyl, and alkylhalophenyl. Exemplary additional monovinylidene aromatic monomers include para-vinyl toluene and α-methylstyrene. In addition to the monovinylidene aromatic monomer, there may also be polymerized therewith in the monovinylidene aromatic polymer minor amounts of other copolymerizable monomers. The various monomers copolymerizable with monovinylidene aromatic monomers are well-known and include, for example, ethylenically-unsaturated nitrile monomers such as acrylonitrile; and ethylenically-unsaturated mono- and difunctional carboxylic acids and derivatives thereof such as esters and, in the case of difunctional acids, anhydrides. In some cases it is also desirable to copolymerize a cross-linking monomer such as divinyl benzene into the monovinylidene aromatic polymer.

Those skilled in the art will also recognize as equivalent compatibilizers various α-olefin copolymer rubbers. The range of equivalence will be recognized to encompass a polymer of an α-olefin monomer having from 2 to 4 carbon atoms and at least one additional different polymerizable olefin monomer (which can be mono- or di-olefin) having from 3 to 16 carbon atoms. For example, the rubber base can be a copolymer of ethylene and one additional α-olefin monomer having from 3 to 15 carbon atoms, preferably from 3 to 5 carbon atoms, for example, propylene. These copolymers are often generically referred to as EP rubbers or EP polymers.

Other nonconjugated diene monomers equivalent to 5-ethylidene-2-norbornene can also be incorporated into the α-olefin copolymer rubber. Other exemplary nonconjugated dienes include 1,4-hexadiene and dicyclopentadiene.

The substrate α-olefin copolymers generally comprise polymerized therein from about 20 to about 80 weight percent based on substrate weight of the $C_2$-$C_4$ α-olefin and from about 20 to about 80 weight percent of a different $C_3$-$C_{16}$ alpha-olefin. In the case of the preferred terpolymeric substrates such as EPDM polymers, from about 1 to about 15 weight percent of the third monomer is polymerized therein.

CONCLUSION

The preferred embodiment illustrates that substantial improvements in impact strength and in minimizing machine orientation in extruded parts can be achieved by incorporating linear low density polyethylene into blends of high density polyethylene and EPDM graft polystyrene. Of course, the foregoing is merely a preferred embodiment of the invention and various The embodiments of the invention in which an exclusive property or privilege is claimed are defined as follows.

1. A polymer blend comprising:
   from about 20 to about 90% of a blend of high density polyethylene and a linear low density polyethylene, of which from about 15 to about 85% comprises said linear low density polyethylene;
   from about 6 to about 60% of a vinyl aromatic polymer; and
   from about 4 to about 20% of a vinyl aromatic grafted alpha-olefin copolymer compatibilizer for said vinyl aromatic polymer and said polyethylenes.

2. The polymer blend of claim 1 in which said vinyl aromatic comprises polystyrene.

3. The polymer blend of claim 2 in which said compatibilizer comprises an EPDM graft polystyrene.

4. The polymer blend of claim 3 in which the graft ratio of grafted polystyrene to EPDM rubber is from about 0.1 to about 2.0.

5. The polymer blend of claim 3 in which the graft ratio of grafted polystyrene to EPDM rubber is from about 0.7 to about 2.0.

6. The polymer blend of claim 5 in which the weight average molecular weight of the grafted polystyrene chains is from about 150,000 to about 225,000.

7. The polymer blend of claim 6 in which the molecular weight of ungrafted polystyrene in said blend is from about 150,000 to about 225,000.

8. A polymer blend comprising:
   from about 90 to about 20% of an olefin combination including a high density polyethylene having a density of at least 0.94 grams per cubic centimeter and a melt index in the range of from about 0.01 to about 35 grams per 10 minutes, and a linear low density polyethylene having a density from about 0.91 to about 0.94 grams per cubic centimeter and a melt index within the range of from about 0.01 to about 15 grams per 10 minutes, said linear low density polyethylene comprising from about 15 to about 85% of said olefin combination;
   from about 6 to about 60% polystyrene having a weight average molecular weight of from about 150,000 to about 225,000; and
   from about 4 to about 20% of an EPDM graft polystyrene compatibilizer having a graft ratio of from about 0.1 to about 2.0 wherein the molecular weight of the grafted polystyrene chains is from about 150,000 to about 225,000.

9. The polymer blend of claim 8 wherein said graft ratio is from about 0.7 to about 2.0.

10. The polymer blend of claim 9 wherein the EPDM base rubber of said EPDM graft polystyrene comprises from about 25 to about 75% by weight ethylene, from about 20 to about 65% by weight propylene and from about 1 to about 10% by weight 5-ethylidene-2-norbornene.

11. A method for improving the directional strength of a blend of a vinyl aromatic polymer, a high density polyethylene and a vinyl aromatic grafted alpha-olefin copolymer compatibilizer comprising:
   introducing a linear low density polyethylene into said blend.

12. The method of claim 11 which comprises blending from about 20 to about 90% of a blend of high density polyethylene and said linear low density polyethylene, of which from about 15 to about 85% comprises said linear low density polyethylene, with from about 6 to about 60% of said vinyl aromatic polymer and from about 4 to about 20% of said compatibilizer.

13. The method of claim 12 in which said vinyl aromatic comprises polystyrene.

14. The method of claim 13 in which said compatibilizer comprises an EPDM graft polystyrene.

15. The method of claim 14 in which the graft ratio of grafted polystyrene to EPDM rubber is from about 0.1 to about 2.0.

16. The method of claim 14 in which the graft ratio of grafted polystyrene to EPDM rubber is from about 0.7 to about 2.0.

17. The method of claim 16 in which the weight average molecular weight of grafted polystyrene chains is from about 150,000 to about 225,000.

18. The method of claim 17 in which the molecular weight of ungrafted polystyrene in said blend is from about 150,000 to about 225,000.

19. A method for producing a vinyl aromatic and olefin polymer blend having surprisingly high impact strength, including impact strength in a cross direction when extruded, comprising blending:
   from about 90 to about 20% of an olefin combination comprising a high density polyethylene having a density of at least 0.94 grams per cubic centimeter and a melt index in the range of from about 0.01 to about 35 grams per 10 minutes, and a linear low density polyethylene having a density from about 0.91 to about 0.94 grams per cubic centimeter and a melt index within the range of from about 0.01 to about 15 grams per 10 minutes, said linear low density polyethylene comprising of said olefin combination from about 15 to about 85%;
   from about 6 to about 60% polystyrene having a weight average molecular weight of from about 150,000 to about 225,000; and
   from about 4 to about 20% of an EPDM graft polystyrene compatibilizer having a graft ratio of from about 0.1 to about 2.0 wherein the molecular weight of the grafted polystyrene chains is from about 150,000 to about 225,000.

20. The method of claim 19 wherein said graft ratio is from about 0.7 to about 2.0.

21. The method of claim 20 wherein the EPDM base rubber of said EPDM graft polystyrene comprises from about 25 to about 75% by weight ethylene, from about 20 to about 65% by weight propylene and from about 1 to about 10% by weight 5-ethylidene-2-norbornene.

* * * * *